UNITED STATES PATENT OFFICE.

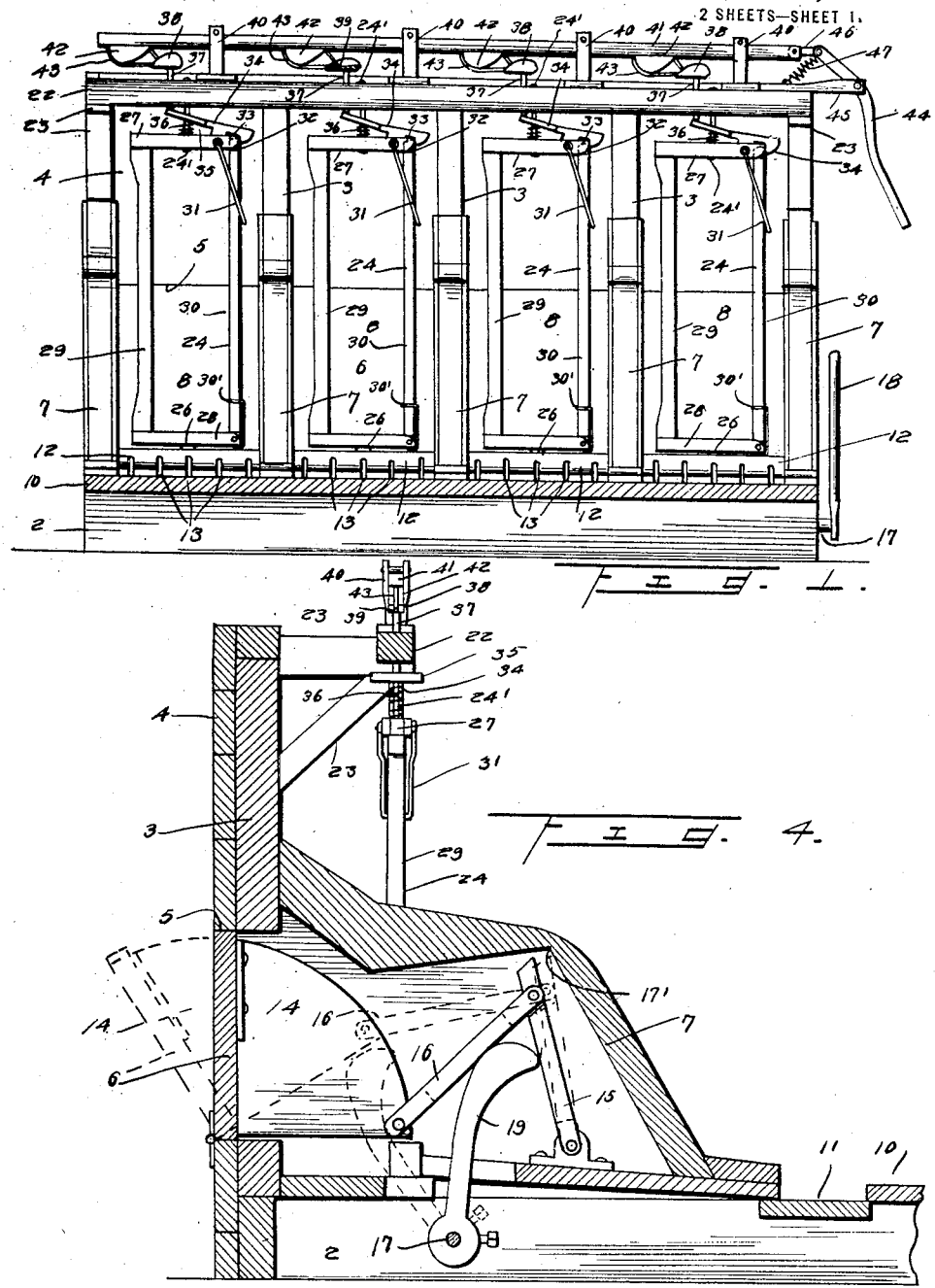

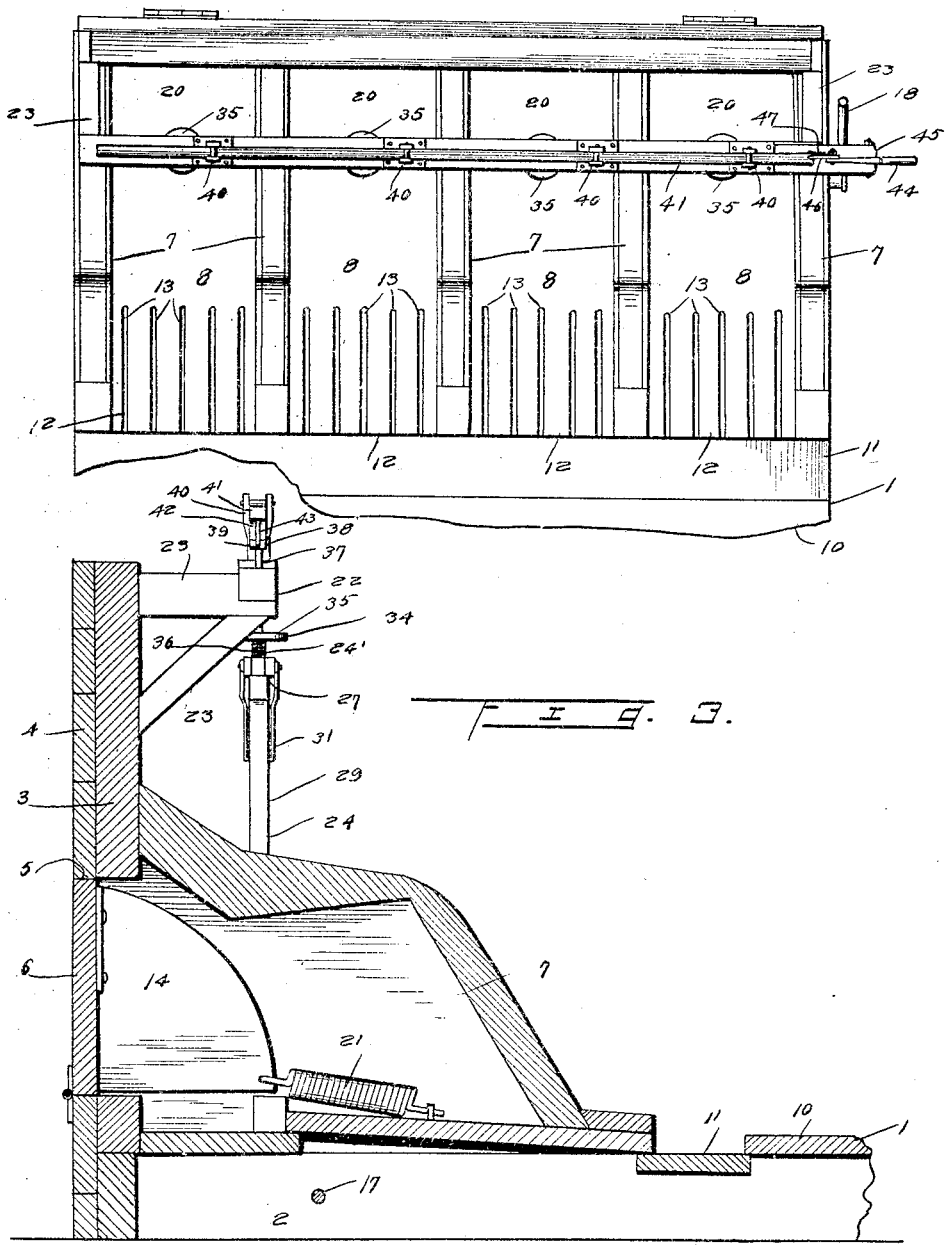

EDMOND HOULE, OF DANVERS, MASSACHUSETTS.

FEED-DOOR FOR STALLS.

1,381,559.  Specification of Letters Patent.  Patented June 14, 1921.

Original application filed January 16, 1920, Serial No. 351,893. Divided and this application filed June 29, 1920. Serial No. 392,642.

*To all whom it may concern:*

Be it known that I, EDMOND HOULE, a citizen of the United States, residing at Danvers, in the county of Essex and State of Massachusetts, have invented certain new and useful Improvements in Feed-Doors for Stalls; and I do hereby declare the following to be a full, clear, and exact description of the invention, such as will enable others skilled in the art to which it appertains to make and use the same.

This invention relates to improvements in feed doors for stalls, being a division of my application filed January 16th, 1920, and serially numbered 351,893, and has for its primary object the provision of means whereby the animals may be supplied with food from the front of the stalls and which means may be easily and quickly opened and closed.

Another object of this invention is the provision of means which keeps the animals separated and prevents them from obtaining each other's food and also forms a protection for parts of the operating means of the feed door.

A further object of this invention is the provision of a feed door for stalls of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:—

Figure 1 is a front elevation illustrating a feed door for stalls constructed in accordance with my invention, and also showing the stanchions in the stalls and which form subject matter of a copending application, Fig. 2 is a top plan view illustrating the same, Fig. 3 is a transverse sectional view illustrating the means for holding the feed door closed, Fig. 4 is a similar view illustrating a portion of the operating means for the feed door.

Referring in detail to the drawings, the numeral 1 indicates as an entirety a barn or stable constructed for use by cows or other animals and includes a base or main frame 2 having secured to its forward end vertical uprights 3 to which is secured a front wall 4 provided with a doorway 5 and which doorway is closed by a hinged door 6. Spaced partitions 7 are secured to the main frame 1 and the uprights 3 to form stalls 8. The partitions 7 terminate short of the rear end of the frame 1 to form a passageway for the animals to enter and go out from the stalls and said passageway has a flooring 10 provided with a gutter 11 extending longitudinally of the device and at the rear of the stalls. The stalls are provided with flooring 12 that inclines in the direction of the trough 11 so that the draining can readily flow into the trough and be conveyed away from the stalls. The rear portions of the flooring 12 are provided with draining grooves 13 that lead to the trough 11. The partitions 7 are of hollow formation and are of any desired design in outline and slidably receive segmental shaped plates 14 which are secured to the inner face of the door 6. The plates 14 also slide through the vertical uprights 3. Arms 15 are pivotally mounted within the partitions 7 and have pivotally connected thereto links 16 which are in turn pivoted to the plates 14. The arms 15 have their upper ends reduced and project beyond the pivotal connection between said arms and the links 16 to engage a shoulder 17' formed by the curvature of the partitions to limit the rearward movement of said arms. A horizontally disposed operating shaft 17 is journaled in the frame 2 and has secured to one end thereof a lever 18 whereby said shaft may be oscillated. Cam shaped elements 19 are secured to the operating shaft 17 and extend upwardly in the partitions 7 to engage the links and on forward movement of said elements they cause said links to swing upwardly which in turn opens the door 6 through the segmental plates 14, and when said cam shaped elements 19 are in their foremost position they engage under the segmental plates and hold the door in an open position so that feed can be placed into feed troughs 20 arranged in the forward ends of each stall. The end segmental plates 14 have springs 21 connected thereto and to the frame instead of the links and arms and which springs are adapted to automatically close the door 6 when the cam shaped elements 19 are swung rearwardly away from their respective segmental plates and links 16. It is to be noted that the feed placed within the feed troughs can only be eaten by the animals of the respective stall to the feeding trough thus preventing the animals from stealing or interfering with each other's food.

A horizontal beam 22 is supported by braces 23 over the stall to which are pivotally connected vertically disposed stanchions 24 by bolts or rods 24' which are secured to the upper ends of the stanchions and journaled in the beam 22. The lower ends of the stanchions 24 are pivoted to the floor of the stalls as illustrated at 26. Each of the stanchions 24 includes upper and lower members 27 and 28 and side members 29 and 30. The side members 29 and 30 are spaced sufficiently apart to receive the neck of an animal but will prevent the animal from drawing its head between said side members. The side member 29 is firmly secured to the upper and lower members 27 and 28, while the side member 30 is hinged to the end of the lower member 28 and is normally urged away from the end of the upper member 27 by means of a spring 30'. A yoke 31 is pivoted to the upper member 27 and slidably receives the pivoted side member 30 for limiting the movement of said side member away from the upper member 27 but will permit said side member 30 to move sufficient to permit the animal to withdraw its head from the stanchions. The upper end of the side member 30 is reduced to form an extension 32 adapted to be received by the bifurcated end 33 of the upper end 27. A catch 34 is pivoted to the upper member 27 and operates in the bifurcated end to engage the extension 32 for holding the side member 30 in engagement with the same. Circular portions 35 are formed on the catch 34 and are provided with slots to receive the bolts or rods 24' and coil springs 36 are mounted on the bolts or rods 24' and are interposed between the circular portion 35 and the upper member 27 for urging the catch into engagement with the extension 32 on the side member 30.

Pins 37 are slidably mounted in the beam 22 and have their lower ends contacting with the circular members 35 of the catches 34 carrying at their upper ends cams 38 which are provided with grooves 39.

Brackets 40 are secured to the beam 22 and slidably support an operating rod 41 which has secured thereto cams 42 adapted to engage the cams 38 for forcing them downwardly which rocks the catches 34 on their pivots to free the side members 30 of the stanchions. Guide elements 43 are carried by the cams 42 and engage the grooves 39 of the cams 38 for keeping the cams 38 in proper alinement with the cams 42 regardless of the position of the stanchions. A lever 44 is pivotally mounted as illustrated at 45 and has one of its ends pivoted to a link 46 which is in turn pivoted to the end of the operating rod 41. A spring 47 is secured to the link 46 and to the beam 22 for the purpose of normally urging the cams 42 away from the cams 38 or in other words return the cams 42 to their initial position after the lever 44 has been released.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A device of the character set forth comprising a frame, a front wall carried by said frame and having a doorway, a hinged door closing said doorway, partitions carried by said frame and front wall to form a plurality of stalls having feeding spaces, segmental plates secured to the door, arms pivotally mounted in said partitions, links connecting said arms to the segmental plates and cam shaped elements adapted to engage the links and segmental plates for opening the door and holding said door in an open position.

2. A device of the character set forth comprising a frame, a front wall carried by said frame and having a doorway, a hinged door closing said doorway, hollow partitions carried by said frame and front wall to form a plurality of stalls having feeding spaces, segmental plates movable in the partitions and secured to the door, arms pivoted in the partitions and limited in their rearward movement by said partitions, links connecting said arms to the segmental plates, an operating shaft journaled in the frame, a handle for said shaft, cam shaped elements secured to the shaft and adapted to engage the links and segmental plates to move the door open and hold said door in an open position, and springs for closing the door when the cam shaped elements are moved rearwardly away from the links and segmental plates.

In testimony whereof I affix my signature in presence of two witnesses.

EDMOND HOULE.

Witnesses:
 JOSEPH D. HOULE,
 ENOCH T. BAILEY.